Aug. 4, 1959　　　P. S. MORGAN　　　2,897,932
RATCHET-TYPE TOOLS AND CLUTCHES THEREFOR
Filed Feb. 24, 1955　　　　　　　　　　2 Sheets-Sheet 2

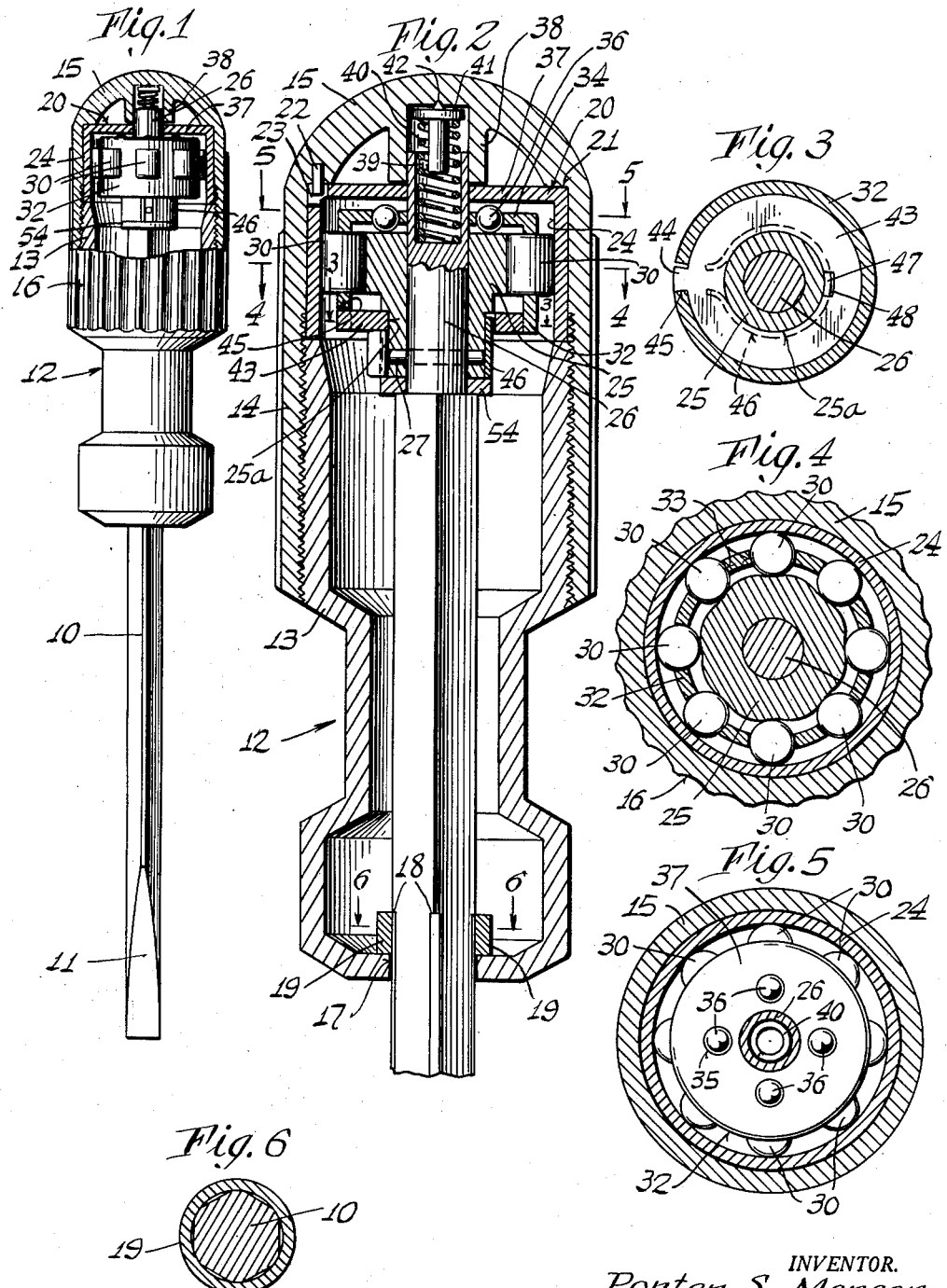

INVENTOR.
Porter S. Morgan
BY
ATTORNEYS

United States Patent Office 2,897,932
Patented Aug. 4, 1959

2,897,932

RATCHET-TYPE TOOLS AND CLUTCHES THEREFOR

Porter S. Morgan, Westport, Conn., assignor to Morgan Development Laboratories, Inc., Westport, Conn., a corporation of Delaware Application February 24, 1955, Serial No. 490,383

13 Claims. (Cl. 192—44)

This invention relates to ratchet-type tools, and more particularly to improvements in clutches for use in such tools.

Heretofore, there have been many proposals seeking to provide a reliable reversible ratchet-type drive between a tool bit and its operating handle, but these have, for the most part, been too complicated to be economically manufactured or too unreliable to be successfully marketed in large quantities.

Prior devices of this kind which have been manufactured and sold in quantity have had the disadvantage of requiring the inclusion in the mechanism of some sort of switch device which had to be separately manually operated to make the clutch ratchet in one direction or in the other direction as desired. Some such devices included a third position to lock the clutch so that the tool could be turned positively in both directions of rotation.

An important feature of this invention is the provision of a reversible ratchet-type clutch and a tool embodying the same in which the direction in which the clutch drives the bit is controlled entirely by the direction of rotation of the handle coincident with the application of pressure on the handle necessary to engage the bit with the work, for example a screw driver bit with a screw.

In certain ratchet-type tools, screw drivers for instance, as heretofore proposed, the clutch between the handle and the tool bit included rollers or balls to be wedged between cooperating surfaces including cam surfaces when the handle is turned. However, these rolling elements were brought into clutching and unclutching positions by the drag produced by one of the cooperating surfaces on the rolling elements, with the result that if the wedging movement and effort were enough to produce a sufficiently positive drive in one direction, considerable effort and movement were required to release the rolling elements so that the handle could be returned idly. As a result, the action of such devices was jerky and frequently required that the tool bit be held by one hand while the other hand rotated the handle in reverse direction.

This difficulty, which contributed largely to the unacceptability of friction-clutch type ratchet tools, is overcome by the present invention by the provision of means operated as an incident to the initial movement of the handle in tool-driving direction for bodily moving the rolling cams from a position out of operating contact with the cooperating surfaces into wedging contact therewith.

In the form of the invention herein illustrated as exemplary thereof and which is at present considered preferable, due to mechanical gain, the initial bodily movement of the rolling elements to clutching position is accomplished by rotary movement of the handle which may be in the order of 0.003" coincident with pressure on the handle axially relative to the tool bit sufficient to hold the latter in engagement with the work, that is to say, the bit in engagement with the screw in the case of the screw driver. This feature of the invention is applicable to clutches and tools embodying the same which ratchet in one direction as well as with those which are reversible so as to ratchet in both directions.

However, another difficulty has been found to exist in reversible clutches employing rolling elements, and that is the tendency of the clutch to grab not only in the direction of intended movement but also unintentionally in return direction, especially when, as in the form of the invention illustrated, the rolling elements are moved bodily from unclutching to clutching position by initial movement of the handle.

To avoid this difficulty, the present invention provides a shiftable stop device for limiting the movement of the rolling elements from clutching to unclutching positions when the handle is given retrograde motion. With the provision of such stop device, when it is desired to reverse the action of the clutch, as when backing out a screw, axial pressure on the handle, accompanied by rotary movement thereof, will shift the stop device to allow the rotary elements to wedge when moved in the new direction but to be limited in returning direction to a position out of driving engagement with the cooperating wedging surfaces.

One of the practical advantages of the device of the present invention is that the axial pressure on the handle may be extremely light, since it does not itself perform any appreciable work in clutching the tool bit to the handle. Therefore, a screw driver of the present invention may be manipulated in what would otherwise be awkward positions, for instance, over one's head practically at the end of his reach where the axial pressure which could be produced would be much less than if one were standing directly behind the screw driver.

Notwithstanding the many advantages of the device of the present invention, it is simple in construction and may thus be manufactured and sold at such prices as to attract a large market.

Other features and advantages will hereinafter appear.

In the accompanying drawings:

Figure 1 is an elevation of a screw driver with part of the handle broken away to illustrate the clutch of the present invention.

Fig. 2 is a longitudinal sectional view of the tool handle of the present invention, showing, in greater detail, the clutch shown in Fig. 1.

Fig. 3 is a transverse section taken on the line 3—3 of Fig. 2, showing the stop plate for impositively limiting the movement of the rolling elements of the clutch between unclutching and clutching positions.

Fig. 4 is a transverse section taken on the line 4—4 of Fig. 2.

Fig. 5 is a view similar to Fig. 4, the section being taken on line 5—5 of Fig. 2.

Fig. 6 is also a transverse section taken on the line 6—6 of Fig. 2, showing the collar for limiting the upward movement of the handle.

Figure 7:
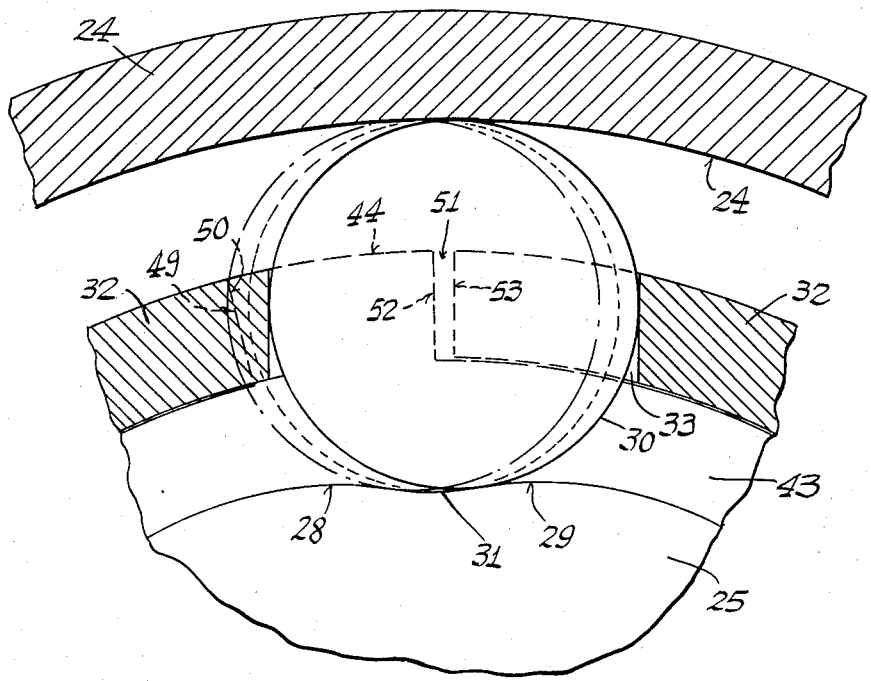

Fig. 7 is a greatly enlarged fragmentary view showing a roller and its relationship with the cooperating surfaces of the handle and tool shank, the roller being shown in full lines at the beginning of its wedging position when the handle is rotated in one direction, by broken lines in its wedging position when the handle is rotated in the opposite direction, and by dotted lines in its neutral or unclutching position.

As shown in the accompanying drawings which illustrate a screw driver to which the clutch of the present invention has particular applicability, the shank 10 of the tool bit 11 extends into a hollow handle 12 which, as shown, is formed of two parts—lower part having a threaded sleeve 13 and an upper part having a threaded cylinder 14, the upper end of which has a head 15 rounded for convenient engagement with the palm of the hand while the fingers may engage the outside fluted surface 16 of the cylinder 14. As shown, the lower end of the handle has a hole 17 through which a portion of the shank 10 extends. The part of the shank which extends through the hole 17 has its corners chamfered off to provide shoulders 18 which engage a collar 19 to determine the outward position of the shank relative to the handle.

The clutch of the present invention is disposed between the shank 10 of the device and the handle 12 and comprises, in the form shown, a hardened sleeve 20 confined between a shoulder 21 on the portion 15 of the handle and the end of the threaded sleeve 13. The sleeve 20 may be connected to always rotate with the handle in any suitable way—a pin 22 secured in the handle extending into a notch 23 in the end of the cup in the form of the invention shown. The sleeve 20 has an internal smooth cylindrical surface 24 forming one of the cooperating surfaces of the clutch. The other cooperating surfaces of the clutch are carried by a collar 25 which has a bore receiving the rounded end 26 of the shank and to which it is secured for rotation therewith by a pin 27. The collar 25 has a plurality of pairs of oppositely diverging external cam surfaces 28 and 29. Located between the cam surfaces 28 and 29 of each pair and the internal surface 24 of the sleeve 20 is a roller 30. When a roller is brought into wedging engagement with either a cam 28 or a cam 29, it becomes jammed between the same and the cylindrical surface 24, thus establishing a driving relation between the sleeve 20 and the collar 25. Between the cam surfaces 28 and 29 there is a dwell 31 into which the roller may pass to non-wedging or unclutching position so that the handle 12 and shank 10 may be rotated independently of each other in either direction.

According to the present invention, the rollers 30 are bodily moved from unclutching position over the dwells 31 to clutching position in engagement with the cam surfaces 28 or 29, and this is accomplished by the initial rotating movement of the handle accompanied by axial pressure on the handle in the direction of the bit 11 of the tool.

To accomplish this, the rollers 30 are contained in a cup-like cage 32, the side walls of which have holes 33 through which the rollers extend and by the walls of which the rollers may be moved bodily with the cage when the latter is rotated.

The closed end or top 34 of the cage 32 has a hole through which the reduced end 26 of the shank freely extends. Also in the top 34 of the cage there is a plurality of holes 35 in each of which there is located a hardened ball 36. The balls are interposed between the plate 37, which may be integral with the sleeve 20, and the end of the collar 25, and are engaged by these surfaces when axial pressure is brought to bear on the handle sufficiently to move it longitudinally toward the shank of the tool.

The upper end of the cylindrical portion 26 of the shank extends into a cylindrical socket 38 in the portion 15 of the handle and guides the longitudinally and rotary movement of the handle at its outer end. The upper end of the portion 26 of the shank has a bore 39, and located in this bore and in the socket 28 there is a spring 40 which tends to hold the handle at the outer limit of its movement as controlled by the collar 19. A washer 41 between the upper end of the spring and the bottom of the socket 38 has a trunnion 43 which permits the handle to rotate without winding or unwinding the spring.

Assuming that the rollers 30 are over the dwells 31, that is to say, are in unclutched position, when axial pressure is applied to the handle in the direction of the tool bit while the latter is engaging the work, a screw for instance, the bottom surface of the plate 37 moves into contact and driving relation wtih the balls 36 which in turn make driving contact with the end of the collar 25. Now, if the handle is rotated, the balls will also be rotated, and being confined in the holes 35 will rotate the cage 32 in the same direction as the handle. Due to the rolling action of the balls 36, the cage will have half the angular movement of the handle, but with twice the force applied to rotate the handle, and this will carry the rollers 30 up on the cams 28 or 29 depending on the direction of rotation of the handle and cause them to jam between and connect the collar 25 on the shank with the sleeve 20 on the handle for movement together.

After the initial rotation of the handle to bring the rollers into clutching position, further rotation in overcoming the work performed by the tool causes the rollers to jam or wedge tighter, thus avoiding slippage regardless of the work load, depending on the strength of the materials employed in the parts.

However, because of the slight included angle between a cam 28 or 29 and the cylindrical surface 24, once the rollers are moved to clutching position, i.e. wedging position, it is not necessary to keep axial pressure on the handle to maintain the handle and tool shank coupled during the continued rotation of the handle in the same direction.

This is a great convenience because, when the screw driver is being operated high above the head or near the end of the user's reach, it is difficult to maintain axial pressure while rotating it to perform work.

At the end of the work-performing rotation of a tool, such as an ordinary screw driver, it is a natural reaction for the user to relax axial pressure on the handle when taking a new grip. This fact is taken advantage of in the use of the tool of the present invention in which the mere reversal of the direction of rotation of the handle with the axial pressure thereon relaxed caused the rollers to be moved out of wedging or clutching position permitting the handle to rotate in reverse direction while the shank remains stationary. This occurs because the rollers 30 are in frictional engagement with the cylindrical surface 24 so as to be moved to released position when the handle moves in reverse direction.

When the rollers 30 reach the dwell 31, they are, as stated above, free of driving engagement with either the cam surfaces 28 or 29 and the cylindrical surface 24. However, due to the weight of the rollers 30, they might be carried beyond the dwells 31 in reversing direction and make frictional contact with the opposite cams and be dragged into wedging relation.

To avoid this difficulty, the present invention provides a shiftable stop for the roller cage 32 which limits the latter to movement in one direction to wedge the rollers in driving relation and in the other direction to movement in which the rollers are located at the dwells 31. This stop device comprises a disk 43 rotatably mounted on a reduced portion 25a of the collar 25 and, as shown, lying for the most part within the confines of the roller cage. The disk 43 has a lug 44 which fits into a notch 45 in the end of the roller cage. The notch 45 is wider than the lug 44 by an amount which is necessary to permit the roller cage to move from unclutching to clutching position in one direction, clockwise as shown in Figs. 3 and 7, and from clutched position to unclutched position when the cage is moved counterclockwise.

The stop disk 43 is coupled to the cam-carrying collar 25 frictionally by a spring 46 which resiliently and frictionally engages the reduced end 25a of the collar and is coupled to the stop disk by a lug 47 which engages a notch 48 in the stop disk. In this way, the stop disk will maintain whatever position it is placed in on the cam-carrying collar, and the position which it assumes depends upon the direction of movement of the cage under the influence of the handle when axial pressure is applied to the handle.

For instance, assuming the parts as located in clutching position shown in Figs. 3 and 7 in which the rollers 30 are in driving relation with the cams 29, clockwise movement of the handle accompanied by axial pressure thereon caused the cage 32 to move clockwise, and, by reason of the engagement of the end 49 of the cage notch with the edge 50 of the lug 44 caused the stop plate 43 to be moved to the position shown. This opened the space 51 between the edge 52 of the lug and the end 53 of the cage notch 48. Reverse movement of the handle without axial pressure being applied thereto will cause the rollers to move under the frictional drag of the sleeve 20 in reverse direction out of wedging relation with the cam surfaces 29 and the cage likewise moves in reverse direction until the end 53 of the cage strikes the edge 52 of the lug 44, in which situation the rollers are prevented from engaging the cam surfaces 28 and the handle may be rotated independently of the shank.

However, assuming that instead of rotating freely it is desired that the handle may, after driving in a screw, rotate the tool in reverse direction to back off a screw for instance, the user will apply axial pressure on the handle while rotating it in reverse direction and this will cause the cage 32 through the action of the balls 36 to be forcefully moved in reverse direction from the position shown in Fig. 7 until the end 53 of the notch 45 engages the edge 52 of the lug 44 and then by such engagement the stop disk and cage will be moved together the amount necessary to move the rollers to wedging or clutching position in engagement with the cam surfaces 28. This movement of the stop disk 43 is in opposition to the friction produced by the spring 46 and consequently the stop disk will remain in the position to which it is moved and will control the cage in its counterclockwise movement from the clutched position with the rollers engaging the cam 28 to the unclutched position with the rollers over the dwell 31, but will not permit the casual movement, i.e. movement in the absence of axial pressure on the handle, beyond the position with the rollers over the dwell by reason of the engagement of the end 49 of the cage with the edge 50 of the lug.

Thus it will be seen that the device of the present invention may be caused to ratchet, that is to say, return idly, either in clockwise direction or counterclockwise direction under the control of the rotation of the handle accompanied by axial pressure on it without any other means to operate, and that inadvertent clutching of the handle to the tool shank in the returning movement is positively prevented in the absence of axial pressure on the handle.

The stop disk 43 and spring 46 are held in desired position on the reduced end 25a of the collar 25 by a shoulder on the latter engaging the stop disk and a washer 54 on the reduced portion 26 of the shank engaging the larger square end portion of the shank 10.

While in the drawings, for illustrative purposes, a considerable space is shown between the plate 37 and the balls 36, it should be understood that the clearance between these parts may be so slight, in the order of 0.001" or less for instance, that the movement is not perceptible to the user when he applied axial pressure to the handle. Likewise, the initial rotary movement applied to the handle to cause the rollers to move to clutching position is so slight, being in the form shown in Fig. 7 a matter of about 3°30', that there is no conscious sensation of lost or idle motion in the use of the tool. For the same reason, the parts do not rattle in handling the tool, the clearance being so small.

Variations and modifications may be made within the scope of the claims and portions of the improvements may be used without others.

I claim:

1. A ratchet-type tool having a tool shank; an operating handle rotatably and axially shiftably coupled to the shank; a clutch for connecting and disconnecting the handle and tool shank in all rotative positions of the former on the shank, said clutch including cooperating converging working surfaces on the handle and shank respectively and rolling wedging members located between the same with locating means for the rolling members; and control means operatively associated with said locating means including antifriction thrust bearing means effective between the outer end portion of the handle and the associated end portion of the shank when the handle is initially axially shifted and rotated relative to the shank for moving said rolling clutch members into position to be wedged between said cooperating converging surfaces upon continued rotation of the handle in the same direction.

2. A ratchet-type tool having a tool shank; an operating handle rotatably and axially shiftably coupled to the shank; a clutch for connecting and disconnecting the handle and tool shank in all rotative positions of the former on the shank, said clutch including cooperating converging working surfaces on the handle and shank respectively and rolling wedging members located between the same with locating means for the rolling members; and control means operatively associated with said locating means including antifriction thrust bearing means effective between the outer end portion of the handle and the associated end portion of the shank when the handle is initially axially shifted and rotated relative to the shank for moving said rolling clutch members into position to be wedged between said cooperating converging surfaces upon continued rotation of the handle in the same direction, said means being free to allow the rolling members to move out of wedged positions when the handle is rotated and axially shifted in the reverse of said original direction.

3. A reversible ratchet-type tool having a tool shank; an operating handle rotatably and axially shiftably coupled to the shank; a clutch for connecting and disconnecting the handle and tool shank in all rotative positions of the former on the shank, said clutch including cooperating converging working surfaces on the handle and shank respectively and rolling clutch members located between the same, one of said converging surfaces including a plurality of cams each having oppositely diverging components with locating means for the rolling members; and control means operatively associated with said locating means including antifriction thrust bearing means effective between the outer end portion of the handle and the associated end portion of the shank when the handle is initially axially shifted and rotated relative to the shank for moving said rolling clutch members into position to be wedged between one or the other of said diverging components and said cooperating converging surfaces upon continued rotation of the handle depending upon the initial direction of rotation thereof.

4. A reversible ratchet-type tool having a tool shank; an operating handle rotatably and axially shiftably coupled to the shank; a clutch for connecting and disconnecting the handle and tool shank in all rotative positions of the former on the shank, said clutch including cooperating converging working surfaces on the handle and shank respectively and rolling clutch members located between the same, one of said converging surfaces including a plurality of cams each having oppositely diverging components; and a rigid cage for said rolling members with antifriction thrust bearing means operatively associated with said cage and effective between the outer end of the handle and the associated end portion of the shank when the handle is initially axially shifted and rotated relative to the shank for moving said rolling members into position to be wedged between one or the other of said diverging components and said cooperating converging surfaces upon continued rotation of the handle depending upon the initial direction of rotation thereof.

5. A reversible ratchet-type tool having a tool shank; an operating handle rotatably and axially shiftably coupled to the shank; a clutch for connecting and disconnecting the handle and tool shank in all rotative positions of the former on the shank, said clutch including cooperating converging working surfaces on the handle and shank respectively and rolling clutch members located between the same, one of said converging surfaces including a plurality of cams each having oppositely diverging components; and a rigid cage for said rolling members with antifriction thrust bearing means operatively associated with said cage and effective between the outer end of the handle and the associated end portion of the shank when the handle is initially axially shifted and rotated relative to the shank for moving said rolling members into position to be wedged between one or the other of said diverging components and said cooperating converging surfaces upon continued rotation of the handle depending upon the initial direction of rotation thereof, said cage being free to allow the rolling members to move out of wedged positions when the handle is rotated and axially shifted in the reverse of said original direction.

6. A reversible ratchet-type tool having a tool shank; an operating handle rotatably coupled to the shank; a clutch for connecting and disconnecting the handle and tool shank in all rotative positions of the former on the shank, said clutch including cooperating converging working surfaces on the handle and shank respectively and rolling clutch members located between the same, one of said converging surfaces including a plurality of cams each having a central dwell and oppositely diverging components; and means operated by the initial axial and rotary movement of the handle relative to the shank for moving said rolling clutch members into position to be wedged between one or the other of said diverging components and said cooperating converging surfaces upon continued rotation of the handle depending upon the initial direction of rotation thereof, said means being free to allow the rolling members to move out of wedged positions with the components of said cams with which they are engaged into positions over said dwells to release the handle from the shank when the handle is moved in the reverse of said initial movement, said handle comprising a shell structure enclosing said clutch as well as a portion of the length of the shank and having an outer free end portion adapted to receive hand thrust and an opposite end portion having telescoping guiding relation with said shank portion incident to the axial and rotational movements of the handle.

7. A reversible ratchet-type tool having a tool shank; an operating handle rotatably and axially shiftably coupled to the shank; a clutch for connecting and disconnecting the handle and tool shank in all rotative positions of the former on the shank, said clutch including cooperating converging working surfaces on the handle and shank respectively and rolling clutch members located between the same, one of said converging surfaces including a plurality of cams each having a central dwell and oppositely diverging components; and a cage for said rolling members operated when the handle is initially axially shifted and rotated relative to the shank for moving said rolling members into position to be wedged between one or the other of said diverging components and said cooperating converging surfaces upon continued rotation of the handle depending upon the initial direction of rotation thereof, and lost motion positioning means frictionally connected to said shank and operably connected to said cage effective to allow the rolling members to move out of wedged positions with the components of said cams with which they are engaged into positions over said dwells to release the handle from the shank when the handle is moved in the reverse of said initial movement.

8. A reversible ratchet-type tool having a tool shank; an operating handle rotatably coupled to the shank; a clutch for connecting and disconnecting the handle and tool shank in all rotative positions of the former on the shank, said clutch including cooperating converging surfaces on the handle and shank respectively and rolling clutch members located between the same, one of said converging surfaces including a plurality of cams each having a central dwell and oppositely diverging components; and means operated by the initial axial and rotary movement of the handle relative to the shank for moving said rolling clutch members into position to be wedged between one or the other of said diverging components and said cooperating converging surfaces upon continued rotation of the handle depending upon the initial direction of rotation thereof, said means being free to allow the rolling members to move out of wedged positions with the components of said cams with which they are engaged into positions over said dwells to release the handle from the shank when the handle is moved in the reverse of said initial movement, and in which means including a self-operating shiftable stop to limit the movement of said rolling clutch members is provided for preventing casual movement of said means operated by said movement of the handle to position which would cause movement of the rolling members into engagement with the opposite components of said cams when the handle is moved in the reverse of said original direction.

9. A reversible ratchet-type tool having a tool shank; an operating handle rotatably and axially shiftably coupled to the shank; a clutch for connecting and disconnecting the handle and tool shank in all rotative positions of the former on the shank, said clutch including cooperating converging surfaces on the handle and shank respectively and rolling clutch members located between the same, one of said converging surfaces including a plurality of cams each having a central dwell and oppositely diverging components; and a cage for said rolling members operated when the handle is initially axially shifted and rotated relative to the shank for moving said rolling members into position to be wedged between one or the other of said diverging components and said cooperating converging surfaces upon continued rotation of the handle depending upon the initial direction of rotation thereof, said cage being free to allow the rolling members to move out of wedged positions with the components of said cams with which they are engaged into positions over said dwells to release the handle from the shank when the handle is moved in the reverse of said initial movement, and in which a stop plate is connected to said shank and continuously operably connected to said cage for preventing casual movement of said cage to position which would cause movement of the rolling members into engagement with the opposite components of said cams when the handle is moved in the reverse of said original direction.

10. A reversible ratchet-type tool having a tool shank; an operating handle rotatably and axially shiftably coupled to the shank; a clutch for connecting and disconnecting the handle and tool shank in all rotative positions of the former on the shank, said clutch including cooperating converging surfaces on the handle and shank respectively and rolling clutch members located between the same, one of said converging surfaces including a plurality of cams each having a central dwell and oppositely diverging components; and a cage for said rolling members operated when the handle is initially axially shifted and rotated relative to the shank for moving said rolling members into position to be wedged between one or the other of said diverging components and said cooperating converging surfaces upon continued rotation of the handle depending upon the initial direction of rotation thereof, said cage being free to allow the rolling members to move out of wedged positions with the components of said cams with which they are engaged into positions over said dwells to release the handle from the shank when the handle is moved in the reverse of said initial movement, in which a stop plate is frictionally connected to said shank and continuously operably connected to said cage for preventing casual movement of said cage to position which would cause movement of the rolling members into engagement with the opposite components of said cams when the handle is moved in the reverse of said original direction, and in which the stop plate is shiftable incidental to initial axial and rotary movement of the handle to positions to limit the movement of the cage in returning directions whether the initial movement of the handle was in one direction or the other.

11. The invention as defined in claim 7, in which said positioning means comprise a stop plate rotatable upon said shank and having lost motion interconnection with the associated end portions of said cage, and frictional drag means effective between said stop plate and said shank.

12. The invention as defined in claim 11, in which the frictional drag means comprise a spring collar sprung over and frictionally engaging the shank and having interengaging rotation transmitting relationship with said stop plate substantially free from lost motion.

13. A reversible ratchet-type tool having a tool shank; an operating handle rotatably coupled to the shank; a clutch for connecting and disconnecting the handle and tool shank in all rotative positions of the former on the shank, said clutch including cooperating converging working surfaces on the handle and shank respectively and rolling clutch members located between the same, one of said converging surfaces including a plurality of cams each having oppositely diverging components; a cage for said rolling members operated by the initial axial and rotary movement of the handle relative to the shank for moving said rolling members into position to be wedged between one or the other of said diverging components and said cooperating converging surfaces upon continued rotation of the handle depending upon the initial direction of rotation thereof, said handle comprising a shell having an outer free end portion enclosing said clutch and adapted to receive hand thrust, the opposite end portion of the shell enclosing a corresponding portion of the length of the shank and having telescoping guiding relation therewith incident to the axial and rotational movements of the handle, said shell comprising an open-ended portion threaded along its outer open end, an elongated externally threaded cap portion screwed onto said threaded open end, said clutch comprising a cylindrical member in the cap portion of the handle and secured therein to provide said working surfaces of the handle and held confined between said open-ended portion and said cap portion, a hub portion fixed to said shank to provide said plurality of cams, a thrust plate in fixed relationship with the cylindrical member, a set of antifriction rolling bodies mounted in said cage adapted for rolling contact with the outer transverse face of said hub portion to be rendered effective when engaged by said thrust plate incident to the inward axial and rotational movement of the handle to wedge the rolling clutch members between said cooperating surfaces.

References Cited in the file of this patent

UNITED STATES PATENTS

| | | |
|---|---|---|
| 1,718,359 | Joseph | June 25, 1929 |
| 1,878,053 | Winger | Sept. 20, 1932 |
| 1,936,640 | Pfauser | Nov. 28, 1933 |
| 2,104,320 | Fischer | Jan. 4, 1938 |
| 2,269,965 | Wemp | Jan. 13, 1942 |
| 2,314,032 | Coxe et al. | Mar. 16, 1943 |
| 2,497,361 | Kesterton | Feb. 14, 1950 |